(12) United States Patent
Rueb (10) Patent No.: US 11,402,627 B2
(45) Date of Patent: Aug. 2, 2022

(54) SYSTEM AND METHOD FOR LIMITING LASER EXPOSURE OF ARBITRARY LASER TEMPLATE PROJECTION

(71) Applicant: Virtek Vision International ULC, Waterloo (CA)

(72) Inventor: Kurt D. Rueb, Kitchener (CA)

(73) Assignee: VIRTEK VISION INTERNATIONAL INC., Waterloo (CA)

( * ) Notice: Subject to any disclaimer, the term of this patent is extended or adjusted under 35 U.S.C. 154(b) by 444 days.

(21) Appl. No.: 16/685,506

(22) Filed: Nov. 15, 2019

(65) Prior Publication Data

US 2020/0159009 A1 May 21, 2020

Related U.S. Application Data

(60) Provisional application No. 62/769,303, filed on Nov. 19, 2018.

(51) Int. Cl.
*G02B 26/08* (2006.01)
*G02B 26/10* (2006.01)
*G02B 27/18* (2006.01)

(52) U.S. Cl.
CPC .......... *G02B 26/105* (2013.01); *G02B 27/18* (2013.01)

(58) Field of Classification Search
CPC .... G02B 26/105; G02B 26/101; G02B 27/18; G02B 26/10; H01S 3/10015

USPC ...................................................... 359/212.1
See application file for complete search history.

(56) References Cited

U.S. PATENT DOCUMENTS

| | | | |
|---|---|---|---|
| 7,756,174 B2 | 7/2010 | Benner, Jr. | |
| 9,200,899 B2 | 12/2015 | Rueb | |
| 9,881,383 B2 * | 1/2018 | Rueb | ............... H04N 9/3185 |

* cited by examiner

*Primary Examiner* — Euncha P Cherry
(74) *Attorney, Agent, or Firm* — Gregory D. Degrazia; Miller, Canfield, Paddock and Stone PLC (57) ABSTRACT

A laser projection system for projecting laser image onto a work surface providing optimized laser energy includes laser source and an electronic circuit for modulating an output power level. A galvanometer assembly includes a scanning mirror operated a mirror control circuit for redirecting the laser beam onto the work surface along a scanning path for generating the laser image. The galvanometer assembly is electronically connected to the electronic circuit for signaling an angular velocity of the scanning mirror to the electronic circuit. A controller includes a scanning path input module for generating a simulation of the angular velocity of the scanning mirror along the scanning path for estimating a concentration of laser energy along areas of the scanning path of the laser beam. The electronic circuit modulates energy concentration of the laser beam in response to the estimated concentration of laser energy and the angular velocity of the scanning mirror.

20 Claims, 5 Drawing Sheets

SYSTEM AND METHOD FOR LIMITING LASER EXPOSURE OF ARBITRARY LASER TEMPLATE PROJECTION

The present application claims priority to U.S. Provisional Patent Application No. 62/769,303 filed on Nov. 19, 2018, the contents of which are included herein by reference.

TECHNICAL FIELD

The present invention relates generally toward a system and method for projecting optical templates using a laser projector. More specifically, the present invention relates to laser scanning energy below a predetermined threshold independent of the arbitrary nature of laser scanned templates used to direct an assembly task.

BACKGROUND

For many manual assembly tasks, such as placing a series of precut carbon fiber sheets to assemble airframe components, optical templates are projected to guide the precise placement of each piece. Typically to provide the precision and accuracy required for accurate placement, the pattern or template is displayed by scanning a laser beam, directed through a pair of rotating galvanometer mirrors, to trace the desired 3D pattern profile on the part surface. If traced with sufficient speed, the path will appear as a stable, flicker free image to guide the placement task.

However, use of a laser presents a potential hazard to the operator, as unintentional direct viewing of the beam can focus to a very small spot on the retina of the operator's eye, potentially causing permanent damage. To assist in ensuring operator safety, laser equipment is rated according to a specific class that characterizes the hazard associated with the specific device. These hazard classifications are based on a "Maximal Permissible Exposure" or MPE that quantifies the level at which exposure can be hazardous (this 'level' of exposure is equivalent to $1/10^{th}$ of the level of energy that would be required to present a 50% chance of forming a lesion on the retina assuming near perfect focusing of the laser on the surface of the retina).

This permissible energy associated with the exposure is based on the amount of energy and the duration of the exposure. Longer exposures permit a higher total energy, as the energy from the laser will begin to diffuse into surrounding tissues, limiting the damage in the tightly focused local area. In terms of the power of the laser, however, a very short exposure to a high power laser will integrate only a limited amount of total energy, and hence acceptable power levels will increase inversely with the time of exposure. For example, the MPE is reached in 384 microseconds for a 5 mW laser source, while a 1 mW laser only reaches the limit in ¼ second.

The regulatory framework defines various classes of laser operation. Based on calculations founded on the MPE, they define an Accessible Emmision Limit (AEL) for various classes of device. For example, Class 1 lasers do not present a hazard under any condition. Class 2 lasers in contrast, remain only within the acceptable limits for exposures less than ¼ second. However, it is assumed that for visible lasers, an operator will be protected by the natural aversive response to a bright light source, by blinking or turning away in less than the second interval. As a result, the only safety requirements are labelling of the device and instructions to avoid staring directly into the laser beam. Similarly, an additional 3R class rating allows 5× greater exposure but does not require onerous safety requirements due to the conservative nature of the standard—i.e. hazards are evaluated on a totally dark adapted eye and the power limit of the MPE itself is quite conservative.

Higher classification ratings, Class 3B and above, are considered inherently hazardous and will present a clear danger to the eye, and in many cases, a hazard even for skin exposure and indirect reflection of the laser light off other surfaces. As a result, such devices generally require controls, such as enclosures or other procedures, that ensure that operators cannot have direct access to the laser beam, or use of goggles that block any visible trace of the wavelength of the laser light. Obviously, such controls are not suitable for use with projected laser templates, where the operator must have physical access to the projected area of the template to assemble components, and clearly, use of goggles which render the laser pattern itself invisible would be problematic. As a result, for purposes such a guiding alignment, the laser systems must be within Class 2 or 3R ratings.

The simplest approach to this requirement is simply to maintain the laser at all times below the average power limit of 1 mW for Class 2 and 5 mW for Class 3R to ensure the system is inherently within the limits of the rating. For example, a typical handheld laser pointer must use this approach. Similarly, traditional laser template projection systems have maintained output always with 5 mW to ensure ratings within Class 3R which do not have any onerous safety requirements for the customer.

Unfortunately, for projection on some materials such as carbon fiber, very little of the laser light is reflected and visibility may be very poor. In addition, when projecting large patterns with high levels of ambient lighting, visibility can be quite poor on any material, if power is maintained at less than 5 mW.

Figure 1:
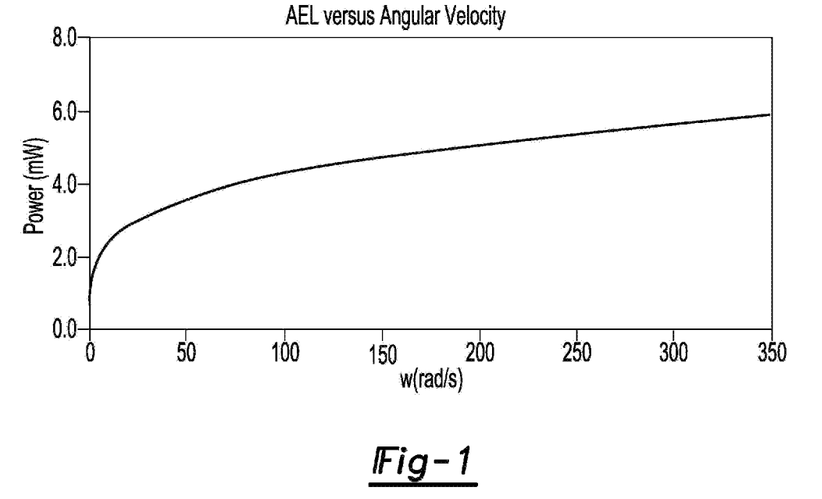
FIG. 1 shows a graph of accessible emission levels of a laser plotted against angular velocity.

However, if the beam is scanned at high speed, it will cross the aperture of the eye (defined as a 7 mm aperture for a fully dark adapted eye for regulatory purposes) in a much shorter period of time, reducing the accessible emission level (AEL) of the radiation sufficiently to allow higher power levels for the source laser (see FIG. 1).

These accessible limits are however, measured under worst case conditions. For example, it is assumed that the closest an eye can accommodate, is to focus at 10 cm. As a result, if the eye is positioned and focused at 10 cm from the scan source, the rotation of the laser as it scans over the opening of the eye could focus to a single spot on the retina, regardless of the rotation of the scanning mirror itself. In addition to limits associated with this single pulse, the average power must also be maintained within class limits (e.g. an average of 1 mW for Class 2 limits). This requirement is of particular concern, if the pattern repeats multiple times within a ¼ second period or transfers through a point more than once in the pattern, effectively increasing the exposure level.

This approach has traditionally been used for rotating laser levels where the beam rotates in a precisely known fashion and the exposure time can be calculated exactly. In this case, higher power Class 3B sources can be used, provided accessible exposure under worst case conditions can be shown to be within AEL limits of the device class. Typically, a simple failsafe circuit can be designed to ensure that laser power is terminated if the desired rotation speed of the laser source is not maintained.

Similarly, for use in laser light shows, higher power levels can be used if it can be shown that the beam is not accessible to the audience, for example, projecting above their heads. If direct scanning of the audience is employed, however, exposure levels must be clearly established. Given that the laser pattern displayed in the show is preconfigured, this can be achieved by manually taking measurements at various locations in the audience seating to determine AEL levels. Providing failsafe control can still be challenging. For example, U.S. Pat. No. 7,756,174 proposes monitoring the scanning velocity of the laser and the scanning pathway size of the beam to validate that the expected predetermined scan patterns are correctly displayed. This process is not practicable for use in manufacturing settings where manufacturing processes cannot be stopped for continually monitoring scanning velocity.

For projection of arbitrary patterns for optical templating such approaches are not feasible, since the nature of the patterns projected is infinitely variable, entirely under control of the customer data, and subject to the guidance requirements of the assembly task. As used herein, "arbitrary" refers to patterns, scanning paths, or templates identified by an end user without knowledge of the manufacturer of the invention of the present application. In addition, workers are often in proximity of the laser patterns because the projection of patterns is used as an assembly aid. Further, there exists a desire to project brighter laser patters on work surfaces to improve visibility that necessarily requires the use of laser power exceeds acceptable limits. As a result under such conditions, ensuring operation safety is a significantly more challenging task.

SUMMARY

A laser projection system and method for projecting laser image onto a work surface providing optimized laser energy is disclosed. A laser source generates a laser beam for projecting a laser image, such as, for example a laser template for directing a work function onto a work surface. An electronic circuit modulates an output power level of the laser source. A galvanometer assembly includes a scanning mirror that is operated by a mirror control circuit for redirecting the laser beam onto the work surface along a scanning path for generating the laser image. The galvanometer assembly is electronically connected to the electronic circuit for signaling an angular velocity of the scanning mirror to the electronic circuit. A controller includes a scanning path input module for generating a simulation of the angular velocity of the scanning mirror along the scanning path while generating the laser template for estimating a concentration of laser energy along areas of the scanning path of the laser beam. The electronic circuit modulates energy concentration of the laser beam along areas of the scanning path in response to the estimated concentration of laser energy along the scanning path. The angular velocity of said scanning mirror maintains a concentration of laser energy below a predetermined threshold.

The system of the present invention provides a failsafe method of providing the brightest possible laser image on a work surface while maintaining the laser energy concentration below a predetermined threshold, i.e. within required safety limits. Now, laser templating may be optimized for use on surfaces that tend to absorb light and in brightly illuminated work environments. The combination of predictive energy concentration of the laser beam and failsafe monitoring of the energy concentration both maintains continuous operation without repeatedly terminating laser projection due to excessive energy concentration while providing the necessary termination procedures.

BRIEF DESCRIPTION OF THE DRAWINGS

Other advantages of the present invention will be really appreciated as the same becomes better understood by reference to the following detailed description when considered in connection with the accompanied drawings, wherein.

DETAILED DESCRIPTION

Figure 2:
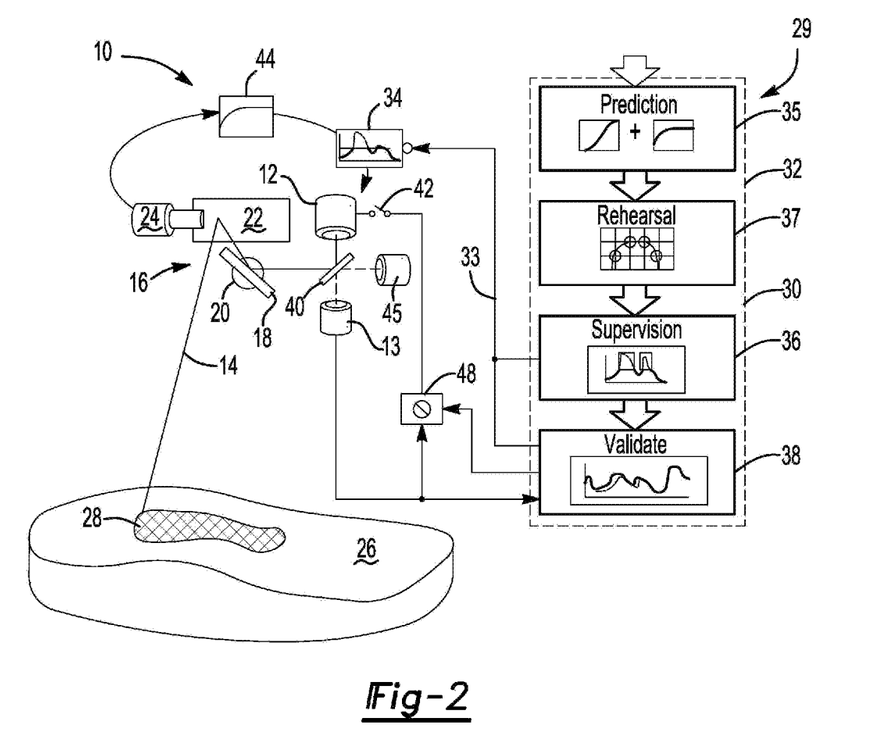
FIG. 2 shows a schematic of the laser projection system of the present invention.

Referring to FIG. 2, a laser projection system capable of modulating laser power is generally shown at 10. The system 10 includes a laser source 12 that projects a laser beam 14 toward a galvanometer assembly 16. The galvanometer assembly includes a first mirror 18 that is driven by a first mirror control circuit 20 and a second mirror 22 that is driven by a second mirror control circuit 24.

The first and second mirror control circuits 20, 24 each define a motor (not shown) and are capable of transmitting angular orientation of the first and second mirror 18, 22, the purpose of which will be described further herein below. The galvanometer assembly 16, by way of the driven first mirror 18 and second mirror 22 redirect the laser beam 14 toward a work surface 26 to scan a laser pattern, such as, for example, a laser template 28 for directing a work process.

A controller 29 directs the laser source 12 and the galvanometer assembly 16 where to project the laser beam 14 onto the work surface 26. The controller 29 includes an active monitor 30 and an intelligent pattern processor 32. The active monitor 30 is electronically connected to the laser source 12 by way of an electronic circuit 33 for limiting analog power to the laser source 12 through a control override circuit 34, if necessary. The active monitor 30 includes a software supervisor 36 and a validation module 38.

A partially mirrored beam splitter 40 directs the laser beam 14 received from the laser source 12 toward the galvanometer assembly 16 and allow a portion of the laser beam 14 through to a laser sensor 43. The laser sensor 43 signals the validation module 38 an output power level of the laser source 12. The validation module 38 compares the output power level signalled from the laser source 12 to a threshold limit, and if exceeded, the validation module limits the amount of power to the laser source 12 or signals the electronic circuit 32 deactivate the laser source 12 via switch 42. An optional detector 45 can sample return light from reference features or retro-reflective targets (not shown) on the tool to permit accurate alignment of the projector pattern to the part or tool surface as is disclosed in U.S. Pat. No. 9,200,899, the contents of which are incorporated herein by reference.

Figure 3:
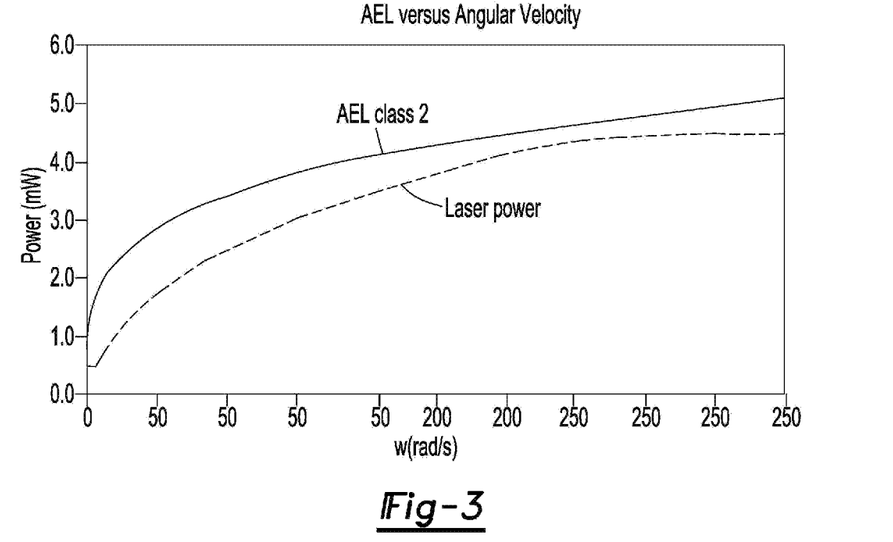
FIG. 3 shows a relationship between AEL Class 2 lasers and response to power control circuit.

An analog power control circuit 44 receives angular position feedback from the first and the second mirror control circuit 20, 24 and differentiates the signal to identify angular velocity of the mirrors 18, 22. Functioning in a closed loop, the analog power control circuit 44 applies a precision voltage rectifier to produce the absolute value of the angular velocity (speed) of the laser beam 14 and calculates the sum of the resultant velocity value of the first and the second mirror control circuit 20, 24. The analog power control circuit 44 applies the precision voltage rectifier to produce the absolute value of the angular velocity (speed) of the laser beam 14 and sums the resultant value for both mirror control circuits 20, 24. A fourth root circuit approximates the shape of an Accessible Emmission Limit (AEL) curve which provides the maximal single pulse laser power, and modifies the response to provide a more linear variation creating a consistent apparent intensity and reduces overall levels to require less intervention by the software supervisor 11. Thus, flicker associated with erratic laser power adjustment is eliminated. The relationship between the AEL Class 2 limit and the smooth response of the power control circuit is shown in FIG. 3 where laser power tracks the Class 2 limit curve, but remains safely below the threshold limits.

As set forth above, the controller 29 includes a pattern preprocessor or scanning path input module 32 that accepts a given projected template pattern 28 from a display list expressed as digital control values. The scanning path input module 32 includes a prediction element 35 for generating predictive algorithms of the arbitrary laser patterns. A rehearsal element 37 generates a simulation of the angular velocity of the scanning mirrors 18, 22 along the scanning path while generating the laser template 28 from the predictive algorithm generated by the prediction element 35. The control values are converted to command voltages for the mirror control circuits 20, 24. It should be understood to those of ordinary skill in the art that the end user sets the template patterns 28 and generates a look up table of a plurality of template patterns, as used herein, "arbitrary laser patterns." Each command voltage is specified at precise command intervals base upon a selected template to determine when the laser beam 14 is visible or not.

The projection process is initiated by the controller 29 initiating analysis of the template 28 display patterns relative to the galvanometer 16 movements and laser beam 14 intensity commands. The effect of the galvanometer 16 movements is invariably delayed while the laser beam 14 intensity commands are essentially instantaneous. Therefore, analysis in one embodiment is conducted separately.

The following sets forth the principles of the simulation for purposes of modulating and optimizing laser energy. The first simulation step includes simulating movement of the first and second mirror control circuit 20, 24 using a step response. The step response is based upon measured response time that closely model actual galvanometer 16 movement and performance as is graphed in FIG. 4.

Figure 4:
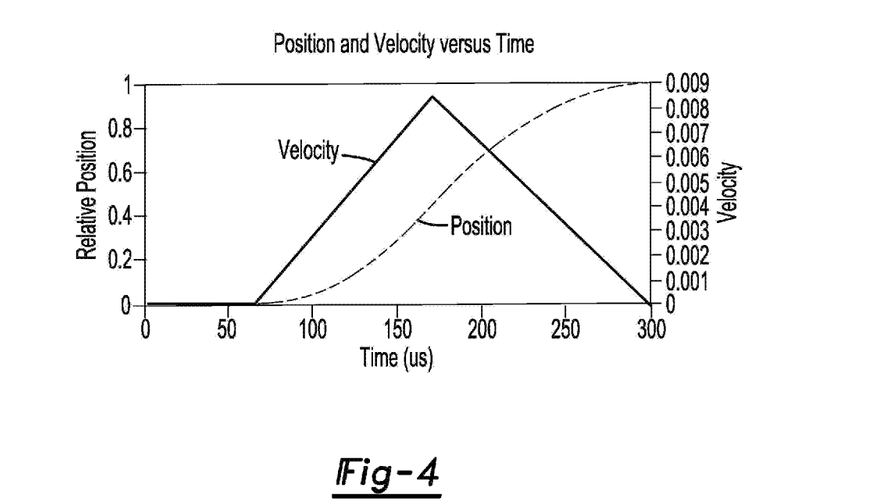
FIG. 4 shows a relationship of position and velocity vs. time.

FIG. 4 shows the movement of all active commands integrated to create a net galvanometer 16 position and velocity of the template 28 display pattern at 10 µs intervals throughout the duration of the display pattern cycle, i.e. generation of the laser template 28. At each interval, the analog power control circuitry is simulated, as illustrated in FIG. 3, to calculate or simulate the output laser power.

Figure 5:
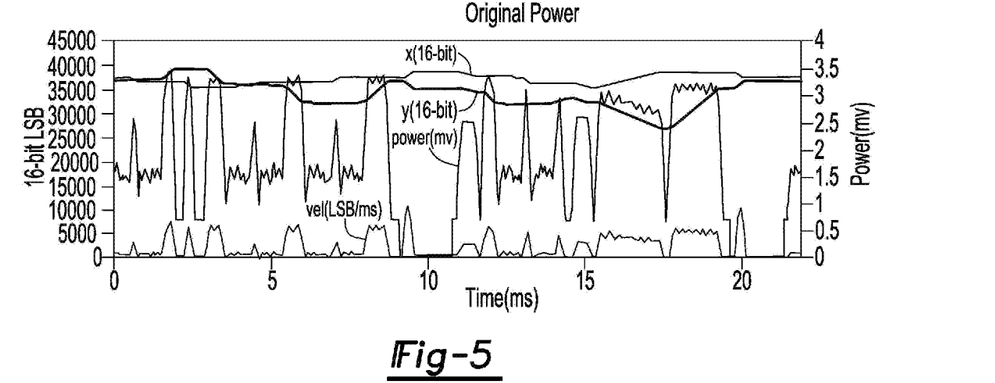
FIG. 5 shows overall summed velocity and original output laser power as it would be produced by the analog power control circuitry without modification by the supervisor of the active software monitor.

The simulation results in a time based simulation of each mirror control circuit 20, 24 position as best represented in FIG. 5 where 16-bit digital angular rotation values are identified in the y axis along with power in mW and time is graphed along the x axis. The overall summed velocity and original output laser power as it would be produced by the analog power control circuit 44 without modification by the software supervisor 36 and the active monitor 30.

Once the energy output by the system 10 has been calculated, the intelligent pattern processor 30 locates localized areas of the projected pattern (template) 28 that could exceed the average power limits of a safety laser class. The processor 30 thus simulates the laser projection and explicitly evaluates output laser energy of the laser beam 14. In this manner the processor 30 maximizes power output to increase visibility of the template 28 while reducing the power output when velocity and power approach the predetermined thresholds of a laser safety class. Thus, laser power is maintained below the acceptable limits while maintaining maximum possible illumination as demonstrated in FIG. 3.

Figure 6:
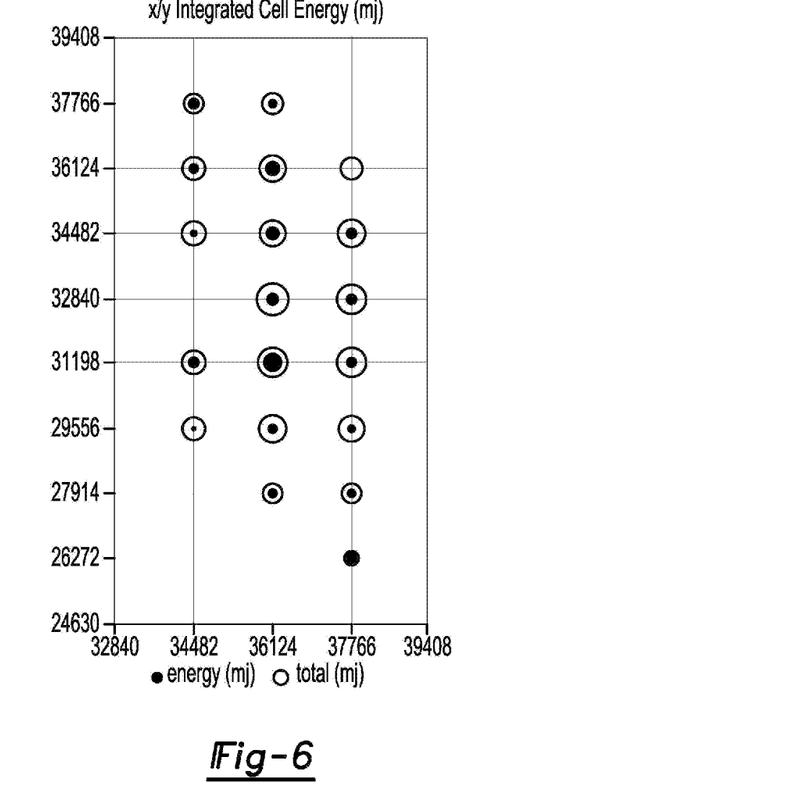
FIG. 6 shows a virtual grid graphic display.

When performing the simulation, laser scanning data required to generate the desired template 28 is initially traced into a virtual grid of cells, each with an extent equivalent to ½ the assigned power measurement aperture (defined by the regulatory standard as the worst case condition of a 7 mm aperture at 10 cm from the scan source). As used herein, "Aperture" refers to power measurement aperture. The maximum size of a human pupil is about 7 mm. The energy exposure of a laser beam scanning across the human pupil is estimated as the time it takes for a laser beam to travel about 7 mm indicating the amount of energy that would be delivered to the eye during this period of time, i.e. the laser power multiplied by the time it takes to cross the aperture summed with all the other exposures that can occur if the laser pattern or scanning path of the laser crosses the area more than once. The simulation of the present invention includes these factors in generating a predicted maximum concentration of laser energy. The energy produced in each 10 µs increment is distributed to all cells traversed by the simulated projection pattern. The total energy for each cell and its eight neighbors is then calculated to conservatively estimate the full area of the laser measurement aperture. FIG. 6 shows an example of a virtual grid at 46 of a sample display pattern. The average power of each cell is estimated as the total energy divided by the minimum of the period of the display pattern, or 0.25 seconds, which is the maximum estimated exposure time based on the aversion response of the human eye. The energy concentration should be within average limits specified by the corresponding limits of the laser safety class for any time interval less than 0.25 s including the period of the display pattern or shorter time periods during which a higher concentration of energy is present.

Figure 7:
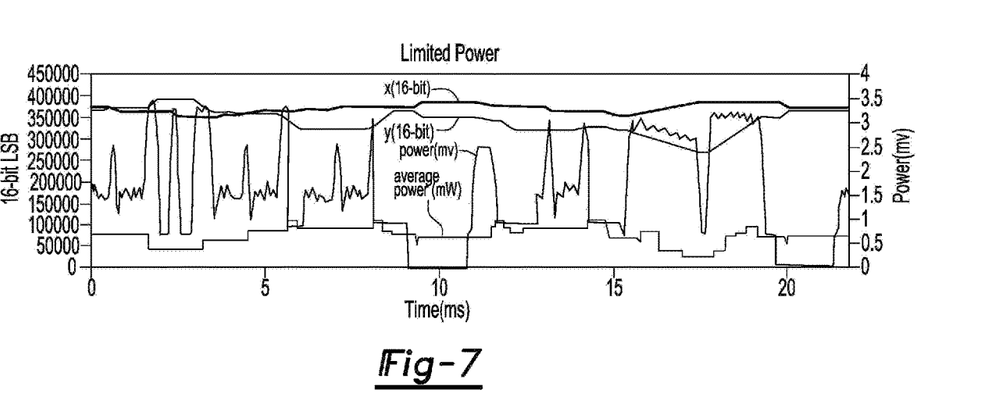
FIG. 7 shows a highlight of a restricted area of a laser scanning pattern.

The simulated laser scanning pattern is then traversed through the cells again, and if the pattern passes through a cell with an average power greater than the AEL of the projector class, the currently active laser intensity setting is reduced to maintain energy exposure within the regulatory limits. The resultant clipped version of the earlier intensity profile from FIG. 5 is shown in FIG. 7, highlighting a restricted area of the pattern in which laser energy could exceed the regulatory limit.

Figure 8:
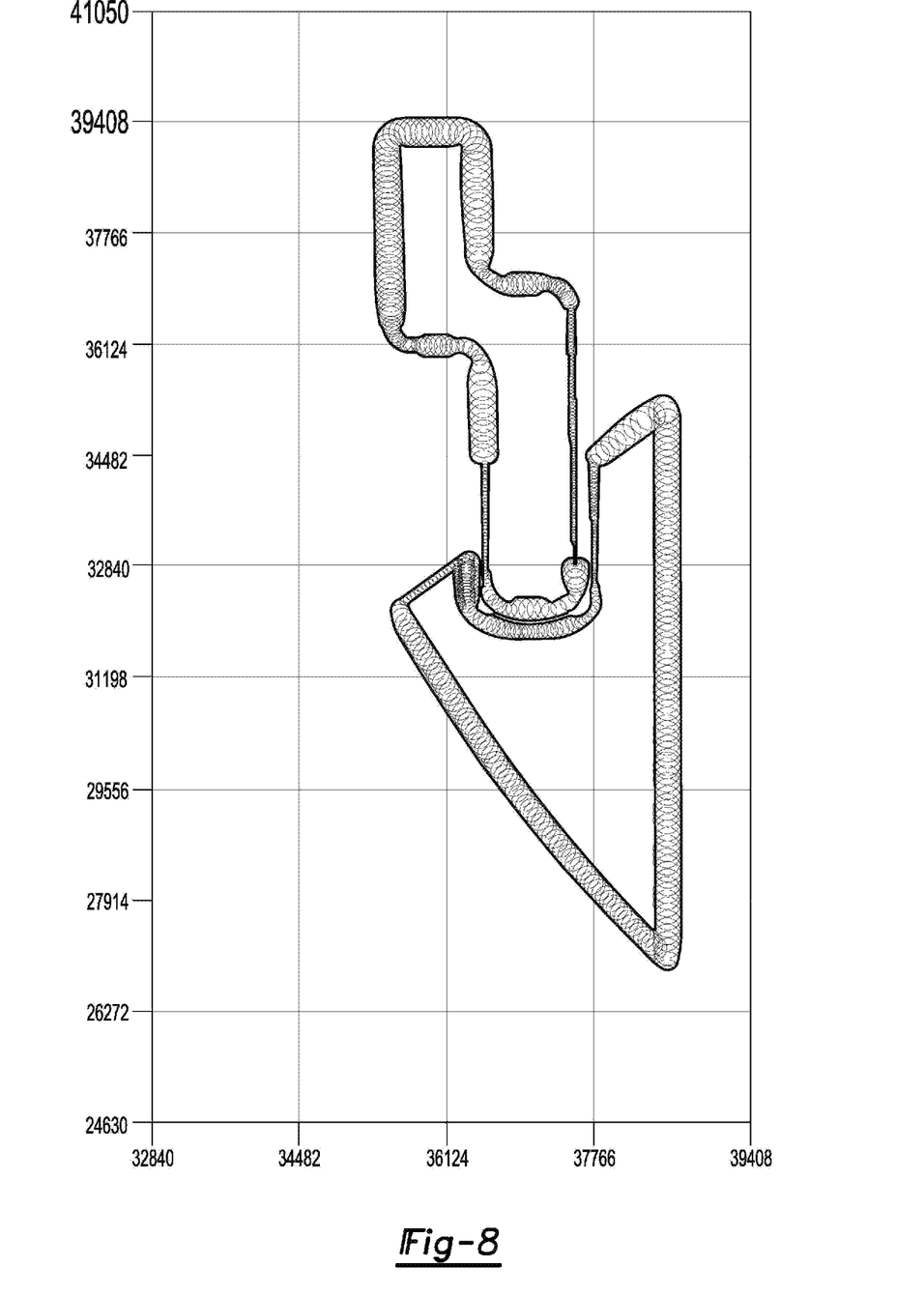
FIG. 8 shows the resultant power output for the displayed pattern after limiting power in areas.

Referring now to FIG. 8, the resultant power output for the displayed pattern after limiting power in areas with excessive laser exposure based upon the simulation performed by the pattern preprocessor 32 is shown. Each 10 µs interval is shown as a plotted line with the laser power output proportional to the width of the line. Note the 'skinny' sections representing smaller diameter laser dots in the center of the plot where the energy concentration of display areas require clipping, or reduction of the power during actual projection of the pattern during the monitoring stage as determined by the simulation.

The initial simulated analysis stage of the pattern preprocessor 32, occurs prior to any actual display of the laser pattern 28 by the laser projector 20. The result of the analysis, including electronic supervisory overrides and detailed time analysis of the predicted laser output, is stored and held pending the actual display of the pattern, typically pending the period of time necessary for the galvanometer assembly 16 to be prepared to start scanning a new pattern 28.

Once the actual display of the pattern or template 28 by the laser projector 20 commences, the laser power is controlled by the active software monitor 30. The monitor 30 has two roles: i) implementing electronic supervisory power overrides as required by the intelligent pattern preprocessor 32 and ii) validating the output of the system 10 using an independent laser power sensor 43 to ensure failsafe operation of the system by terminating power when the predetermined threshold is exceeded by signalling hardware limit circuit 48 to terminate power to the laser source 12.

Figure 9:
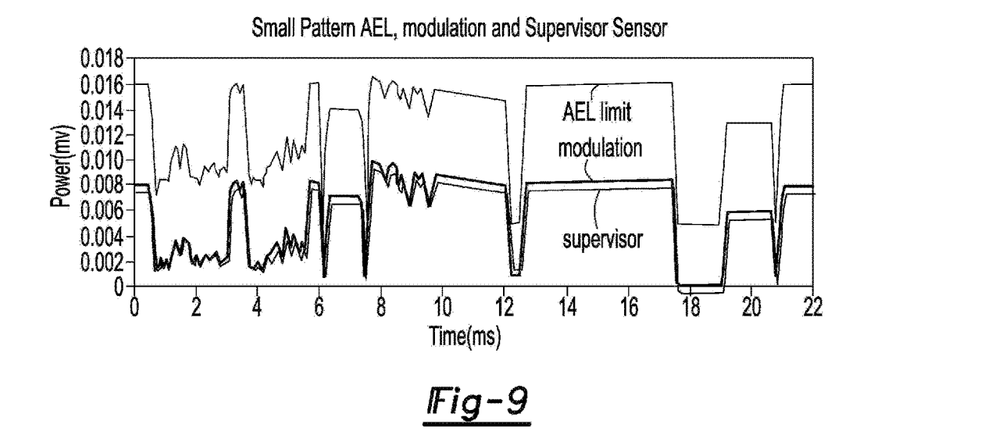
FIG. 9 shows real laser pattern data recorded by the software monitor.

When the actual display by way of laser projection begins, the active monitor 30 begins measuring the laser power sensor 43 at 10 μs intervals, digitizing the sensor voltage, converting to an equivalent energy reading in micro Joules, and recording the measured reading in the appropriate entry of the stored response record predicted by the pattern preprocessor 32. An example of the data recorded by the active monitor 30 is provided in FIG. 9, showing the AEL limit, the predicted laser power produced by the analog power control circuitry and the actual measured laser beam 14 output energy from the laser power sensor 43 over the 21.8 ms duration of the pattern cycle period.

The role of the software supervisor 36 is straightforward. If the current position in the display record previously generated by the intelligent pattern preprocessor 32 requires a limitation of the analog power control circuitry, the supervisor 36 activates the control override circuit 34 to limit the analog power control by the required amount determined during the preprocessor 32 analysis. Therefore, the software supervisor 14 governs a variable power output of the laser source 12 by receiving input from both the intelligent pattern processor 30, which is based upon predictions and simulated rehearsals and from the laser power sensor 43, which provides real time laser power input.

Validation is more complex ensures that no single failure in the system 10 can result in unsafe exposure levels above the threshold limits can occur. The overall energy in a moving 300 μs window following the currently recorded power sample from the laser power sensor 43 is compared to the regulatory limits or predetermined threshold. If at any time, the active monitor 30 detects total energy in the window in excess of that allowed by the monitor based upon the simulation by the intelligent pattern processor 30 the system will progressively step through reduced power levels of the control override circuit 34 until the laser output energy is within the required limits. In conjunction with the software monitor, any unsafe exposure that could occur in less than the 300 μs window interval of the monitor, such as an extreme failure due to shorting the laser drive circuit, will activate the hardware safety circuit 14 and cut any drive power to the laser circuit.

In addition, the control override circuit 34 power is configured to force laser power below average class power threshold, and the hardware safety circuit 48 is electronically signalled to cut power to the laser source 12 immediately if any output beyond the class average threshold occurs to prevent any possible exposure beyond the threshold. This 'graceful' failure mode will generally ensure that system faults will result in at most a partial reduction in expected output and still provide useful projection capability and is only used as an additional safety protocol. It is believed that the predictive simulations suffice to prevent the laser beam 14 from scanning at energy levels beyond the predetermined thresholds.

It should be understood by those of ordinary skill in the art that the analysis by the intelligent pattern preprocessor 32 is completed before any part of the pattern 28 is actually displayed on the work surface 26 of the object and cannot be bypassed by the normal application software since all processing is performed within the system 10. Merely programming arbitrary projection patterns cannot disengage the simulation generated by the intelligent pattern preprocessor 32. In addition, the processing module of the intelligent pattern processor 30 and process that performs the analysis and dynamically monitors the supervisor sensor during projection, also displays the pattern by setting the individual galvanometer mirror control circuit 20, 24 scan voltages. Any failure in the processor 30 would halt movement of the scanning mirrors 18, 22 and the hardware laser power modulation (power control circuit 50) would immediately drop the output energy to the lowest power level.

In a typical alternate configuration, the laser source 12 is a fiber coupled laser and the laser power sensor 43 is configured as the primary power feedback for the control circuitry for the laser source 12 and the active monitor 30 of the laser source is configured for purposes of the secondary failsafe sensor. This arrangement provides the most precise control of the output power level of the laser beam 14 as the power level measured by sensor 43 directly precedes the final output and is not affected by any change in coupling efficiency of the fiber coupled laser source itself.

The invention has been described in an illustrative manner, and it is to be understood that the terminology that has been used is intended to be in the nature of words of description rather than of limitation. Obviously, many modifications and variations of the present invention are possible in light of the above teachings. It is therefore to be understood that within the specification, the reference numerals are merely for convenience, and are not to be in any way limiting, and that the invention may be practiced otherwise than is specifically described. Therefore, the invention can be practiced otherwise than is specifically described within the scope of the intended claims.

What is claimed is:

1. A laser projection system for projecting laser image onto a work surface providing optimized laser energy; comprises:
   a laser source generating a laser beam for projecting a laser image onto a work surface;
   an electronic circuit for modulating an output power level of said laser source;
   a galvanometer assembly including a scanning mirror being operable by a mirror control circuit for redirecting the laser beam onto the work surface along a scanning path thereby generating the laser image, said galvanometer assembly being electronically connected to said electronic circuit for signaling an angular velocity of said scanning mirror to said electronic circuit;
   a controller including a scanning path input module for generating a simulation of the angular velocity of said scanning mirror along the scanning path while generating the laser template thereby estimating a concentration of laser energy along areas of the scanning path of the laser beam; and said electronic circuit modulating energy concentration of the laser beam along areas of the scanning path in response to the estimated concentration of laser energy along the scanning path and the angular velocity of said scanning mirror thereby maintaining a concentration of laser energy below a predetermined threshold.

2. The system set forth in claim 1, wherein said galvanometer assembly includes a second scanning mirror being operable by a second mirror control circuit, said first mirror control circuit being cooperable with said second mirror control circuit for redirecting the laser beam onto the work surface along a scanning path.

3. The system set forth in claim 1, including a laser sensor for sensing laser energy concentration and being electrically connected to a control circuit for terminating projection of the laser beam when energy concentration of the laser beam along areas of the scanning path exceed a predetermined limit.

4. The system set forth in claim 1, wherein said controller includes an active monitor being electronically connected to said scanning path input module, said active monitor receiving power limiting instructions from said scanning path input module for limiting laser energy along areas of the scanning path for concentration of laser energy along areas of the scanning path thereby maintaining concentration of laser energy a predetermined limit.

5. The system set forth in claim 2, wherein said first mirror control circuit and said second mirror control circuit are electronically connected to a power control circuit signalling said power control circuit a location of the laser beam on the scanning path and said power control circuit controlling power to said laser projector based upon the location of the laser beam on the scanning path.

6. The system set forth in claim 1, wherein said laser projector is adapted to project arbitrary laser templates and said scanning path input module and said electronic circuit modulate energy concentration of the laser beam along areas of the scanning path in response to estimated concentration of the laser beam.

7. The system set forth in claim 1, wherein said controller includes an active monitor includes a power supervisor for modulating laser power beneath a predetermined level based upon the simulation of average energy exposure of the laser beam along areas of the scanning path.

8. The system set forth in claim 3, wherein said sensor is electronically connected to said active monitor and said active monitor is programmed to compare actual laser energy concentration with said simulated laser energy concentration for modulating output power level when the actual laser energy concentration exceeds simulated laser energy concentration.

9. The system set forth in claim 3, wherein said scanning path input module includes a prediction element for generating predictive algorithms of the arbitrary laser patterns.

10. The system set forth in claim 3, wherein said scanning path input module includes a rehearsal element for generating the simulation of the angular velocity of said scanning mirror along the scanning path while generating the laser template.

11. A method of projecting a laser image providing optimized laser energy, comprising the steps of:

providing a laser projector for projecting a laser beam and a galvanometer assembly for directing the laser beam along a scanning path thereby generating a laser image;

providing an electronic circuit for modulating an output power level of said laser source;

predetermining a maximum concentration of laser energy;

predicting concentration of laser energy along the scanning path while generating the laser image based upon a simulation of the projection of the laser beam along the scanning path; and said electronic circuit modulating concentration of laser energy while said laser beam traverses the scanning path for optimizing illumination of the laser image while monitoring concentration of laser energy for determining if the concentration of laser energy is below the predetermined maximum concentration of laser energy based upon the simulation of the projection of the laser beam along the scanning path.

12. The method set forth in claim 11, wherein said step of predicting concentration of laser energy is further defined by estimating concentration of laser energy along areas of the scanning path of the laser beam.

13. The method set forth in claim 11, further including a step of simulating angular velocity of said galvanometer assembly for estimating concentration of laser energy along areas of the scanning path of the laser beam.

14. The method set forth in claim 11, wherein said step of providing a galvanometer assembly is further defined by providing a first mirror control circuit and a second mirror control circuit and simulating angular velocity by simulating angular velocity of said first mirror control circuit and said second mirror control circuit.

15. The method set forth in claim 11, further including a step of sensing concentration of laser energy generated by said laser projector for terminating projection of the laser beam when the concentration of laser energy exceeds a predetermined limit.

16. The method set forth in claim 11, further including a step of actively monitoring simulation of a scanning path and moderating actual concentration of laser energy from the simulation of the scanning path.

17. The method set forth in claim 11, further including a step of said galvanometer assembly signalling a location of the laser beam to said controller on the scanning path thereby enabling said electronic circuit to synchronize the actual location of the laser beam on the scanning path with a simulated location of the laser beam on the scanning path.

18. The method set forth in claim 11, further including a step of said electronic circuit comparing the actual concentration of laser energy with the simulated concentration of laser energy and modulating output power level of said laser projector when actual concentration of laser energy exceed simulated concentration of laser energy.

19. The method set forth in claim 11, wherein said step of directing the laser beam along a scanning path thereby generating a laser image is further defined by directing the laser beam along an arbitrary scanning path thereby generating a laser image.

20. The method set forth in claim 11, further including a step of rehearsing projection of the laser beam along a scanning path for generating the simulation of the angular velocity of said galvanometer assembly while generating the laser image.

* * * * *